(12) United States Patent
Tatsumi (10) Patent No.: US 9,225,167 B2
(45) Date of Patent: Dec. 29, 2015

(54) PROTECTION ELEMENT, SEMICONDUCTOR DEVICE, AND ELECTRONIC SYSTEM

(71) Applicant: Sony Corporation, Tokyo (JP)

(72) Inventor: Takaaki Tatsumi, Kanagawa (JP)

(73) Assignee: Sony Corporation, Tokyo (JP)

( * ) Notice: Subject to any disclaimer, the term of this patent is extended or adjusted under 35 U.S.C. 154(b) by 6 days.

(21) Appl. No.: 13/933,783

(22) Filed: Jul. 2, 2013

(65) Prior Publication Data

US 2014/0022677 A1    Jan. 23, 2014

(30) Foreign Application Priority Data

Jul. 18, 2012   (JP) .................................. 2012-159788

(51) Int. Cl.
*H02H 3/08* (2006.01)
*H02H 9/02* (2006.01)
*H02H 9/04* (2006.01)

(52) U.S. Cl.
CPC ..................... *H02H 9/046* (2013.01)

(58) Field of Classification Search
USPC .......................................................... 361/56
See application file for complete search history.

(56) References Cited

U.S. PATENT DOCUMENTS

| | | | |
|---|---|---|---|
| 8,009,397 B2 * | 8/2011 | Etherton et al. ................. | 361/56 |
| 2009/0040671 A1 * | 2/2009 | Zhang ............................. | 361/56 |
| 2013/0070376 A1 * | 3/2013 | Zhu et al. ........................ | 361/56 |

FOREIGN PATENT DOCUMENTS

JP          2010-050312          3/2010

* cited by examiner

*Primary Examiner* — Dharti Patel
(74) *Attorney, Agent, or Firm* — Sony Corporation (57) ABSTRACT

A protection element includes a first wiring line configured to be supplied with a signal voltage when electric current is on; a second wiring line configured to be supplied with a criterion voltage; a detection circuit connected between the first wiring line and the second wiring line, and configured to detect the signal voltage inputted onto the first wiring line; an inverter circuit including a plurality of inverters connected between the first wiring line and the second wiring line, and configured to be supplied with a reference voltage having a same level as that of the signal voltage between an odd-numbered inverter and an even-numbered inverter when electric current is on; and a protection transistor connected between the first wiring line and the second wiring line, and having a gate configured to receive output of the inverter circuit.

10 Claims, 6 Drawing Sheets

PROTECTION ELEMENT, SEMICONDUCTOR DEVICE, AND ELECTRONIC SYSTEM

BACKGROUND

The present disclosure relates to a protection element for protecting a circuit to be protected against electrostatic discharge caused by external static electricity, and a semiconductor device including the protection element. Also, the present disclosure relates to an electronic system including the semiconductor device.

In general, in a semiconductor integrated circuit, such as a Large Scale Integration (LSI) and so on, importance is increasing in protecting a circuit to be protected against a surge current that occurs on a power line of an internal circuit (hereinafter referred to as a circuit to be protected) having a predetermined function with a trend toward smaller circuit sizes and lower voltages.

As a typical surge current that occurs on a power line, an ESD surge, which is a sharp rise in power line voltage by electrostatic discharge (ESD) on an external terminal of the power line, is widely noted.

It becomes necessary for an element or a circuit (hereinafter referred to as a protection element) that protects a circuit to be protected against an ESD surge to have a function of determining whether an input electric signal is an ESD surge or not. In such a protection element, a determination is made that if an input electric signal is an ESD surge, the input electric signal is diverted outside, and if not, the input electric signal is allowed to directly pass through the circuit to be protected.

In a Gate Grounded Metal Oxide Semiconductor (GG-MOS), which is a typical protection element, the determination is made on the basis of an input voltage. For example, in the case where a circuit to be protected usually operates at 2 V, and a withstand voltage is 4 V, the GGMOS that protects the circuit to be protected is adjusted to work at input of 3 V. Thereby, for example, if the input voltage becomes 3 V or more, the GGMOS diverts the current, and thus the circuit to be protected is protected.

Also, as another typical protection element, a protection element having an RCMOS structure is provided. In the RCMOS structure, a resistor and a capacitor are connected to a CMOS-type inverter. The RCMOS is generally used for a protection element that protects a power source circuit, and determines whether an input electric signal is an ESD surge current or not by a rise time of the input pulse. In the power source circuit, a rise time of a pulse of turning on the power is long, and a rise time of an ESD surge is short. Accordingly, in the RCMOS, if the rise time of the pulse of the input electric signal is short, the input current is determined to be an ESD surge current, and the current is diverted outside, and if the rise time of the pulse of the input electric signal is long, the input current is determined to be a power source current, and the current is allowed to flow into the power source circuit.

Japanese Unexamined Patent Application Publication No. 2010-50312 has disclosed a configuration of an ESD protection circuit including a protection circuit section and a control circuit section. In this configuration, the control circuit section detects whether a voltage detected by the protection circuit section exceeds a threshold voltage X or not, and thereby a circuit to be protected is protected against an ESD surge. In Japanese Unexamined Patent Application Publication No. 2010-50312, it is possible to prevent erroneous detection of a voltage having a sharp slew rate, which occurs at the time of turning on the power, as an ESD surge by disposing a control circuit section.

However, in a configuration in which the ESD protection circuit includes a protection circuit section and a control circuit section as described above, the circuit configuration is complicated compared with a simple RCMOS, and thus the circuit area is also large.

Accordingly, for the protection element, in addition to having a function of suitably protecting a circuit to be protected, it is desirable to make the circuit area smaller.

SUMMARY

In view of the above-described points, the present disclosure provides a protection element having a function of protecting a circuit to be protected more suitably, and having a small circuit area at the same time. Also, the present disclosure provides a semiconductor device using the protection element, and an electronic system.

According to an embodiment of the present disclosure, there is provided a protection element including: a first wiring line configured to be supplied with a signal voltage when electric current is on; a second wiring line configured to be supplied with a criterion voltage; a detection circuit connected between the first wiring line and the second wiring line, and configured to detect the signal voltage inputted onto the first wiring line; an inverter circuit including a plurality of inverters connected between the first wiring line and the second wiring line, and configured to be supplied with a reference voltage having a same level as that of the signal voltage between an odd-numbered inverter and an even-numbered inverter when electric current is on; and a protection transistor connected between the first wiring line and the second wiring line, and having a gate configured to receive output of the inverter circuit.

In a protection element according to the present disclosure, at assembly time of a circuit, the protection transistor operates by the output of the inverter in the final stage. Also, at the time that electric current is on, when the reference voltage and the signal input onto the first wiring line are the same level, the protection transistor becomes an off state, and if the signal input onto the first wiring line is higher than the reference voltage, the protection transistor becomes an on state.

According to another embodiment of the present disclosure, there is provided a semiconductor device including the above-described protection element and a circuit to be protected connected to the first wiring line.

A semiconductor device according to the present disclosure includes the protection element described above, and thus if a surge current flows when electric current is on at assembly time of the circuit, a circuit to be protected is protected. Also, if a scheduled normal signal flows when electric current is on, that signal flows through the circuit to be protected.

According to another embodiment of the present disclosure, there is provided an electronic system including the semiconductor device described above.

An electronic system according to the present disclosure includes the protection element described above, and thus if a surge current flows when electric current is on at assembly time of the circuit, a circuit to be protected is protected. Also, if a scheduled normal signal flows when electric current is on, that signal flows through the circuit to be protected.

By the present disclosure, it is possible to obtain a protection element having a function of protecting a circuit to be protected more suitably and having a small circuit area. Also, by the present disclosure, by incorporating the protection

BRIEF DESCRIPTION OF THE DRAWINGS

FIG. 4 is a circuit diagram of the semiconductor device when electric current is on;

FIG. 5 is a simulation result of a current $I_1$ flowing through the protection transistor, and a current $I_2$ flowing through the circuit to be protected when electric current is on;

FIG. 6 is a circuit diagram of the semiconductor device in the case where an ESD surge enters when electric current is on;

FIG. 7 is a simulation result of a current $I_3$ and a voltage $V_1$ at the drain of the protection transistor, and a current $I_1$ flowing through the protection transistor in the case where an ESD surge enters when electric current is on;

FIG. 8 is a simulation result of a current $I_1$ flowing through the protection transistor, and a current $I_2$ flowing through the circuit to be protected in the case where an ESD surge enters when electric current is on;

DETAILED DESCRIPTION OF EMBODIMENTS

Figure 10:
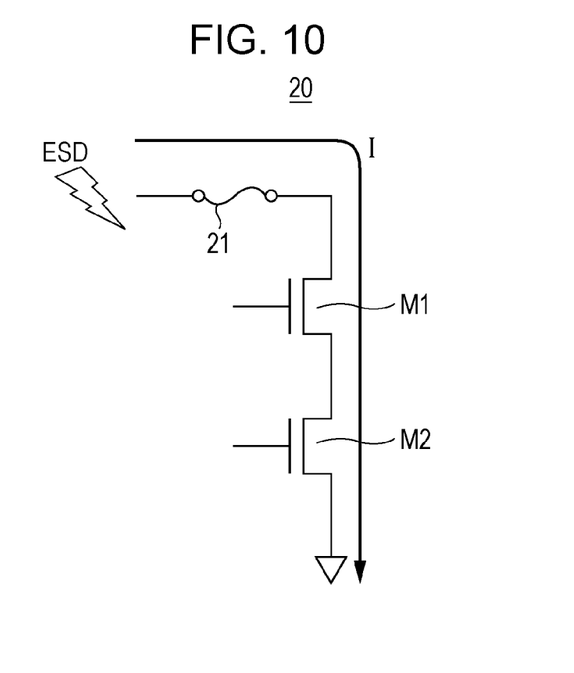
FIG. 10 is a circuit diagram illustrating an example of a circuit to be protected including an electric fuse in a state in which a protection element is not connected.
Figure 11:
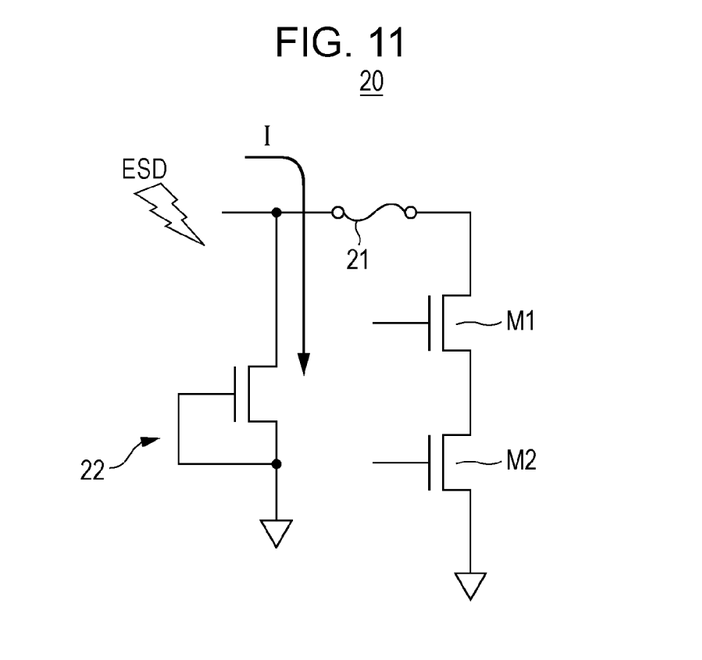
FIG. 11 is a circuit diagram (1 of 2) in the case where a GGMOS is connected to the circuit in FIG. 10 as a protection element.
Figure 12:
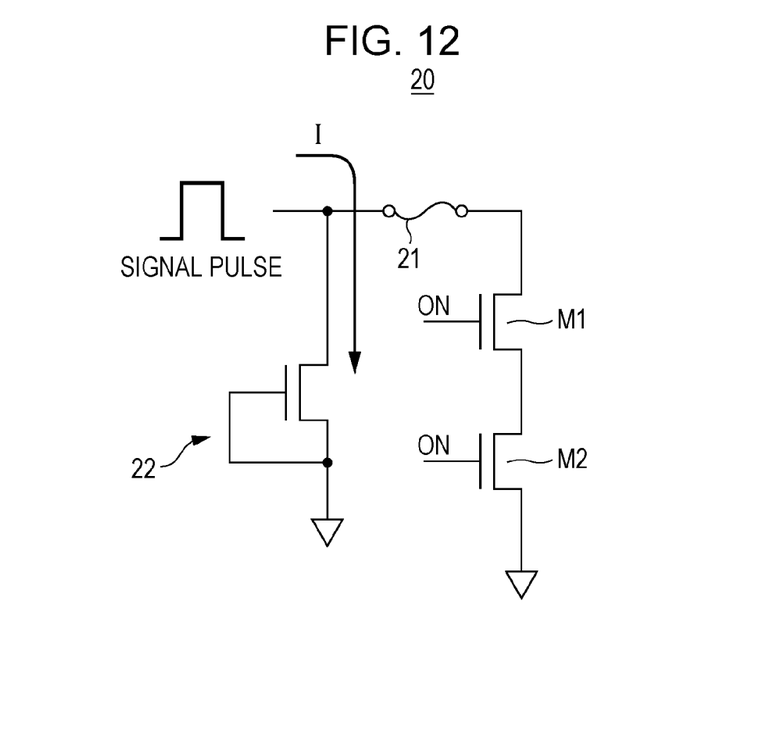
FIG. 12 is a circuit diagram (2 of 2) in the case where a GGMOS is connected to the circuit in FIG. 10 as a protection element.

Prior to the description of an embodiment of the present disclosure, a description will be given of an example in which a protection element including a related-art GGMOS is connected to a circuit to be protected including an electric fuse. FIG. 10 is a circuit diagram illustrating an example of the circuit to be protected including an electric fuse 21 in a state in which a protection element is not connected. FIG. 11 and FIG. 12 are circuit diagrams in the case where a GGMOS 22 is connected to the circuit in FIG. 10 as a protection element.

In general, in semiconductor devices including an electric fuse, a plurality of electric fuses are disposed in a circuit. An electric fuse selected as necessary is broken so that a desired processing is made possible. In FIG. 10 to FIG. 12, examples are given of a circuit in which one electric fuse 21 and two MOS transistors M1 and M2 in a subsequent stage are connected in series. Also, in FIG. 11 and FIG. 12, a GGMOS 22 is connected to a preceding stage of the electric fuse 21. In the above configuration, in FIG. 10 to FIG. 12, the electric fuse 21 is configured to be broken by a voltage of 4 V. And in FIG. 11 and FIG. 12, the GGMOS 22 is configured to operate at an input voltage of 3.5 V.

First, a description will be given of the case where a current I caused by an ESD surge flows at assembly time of the circuit in the circuit configuration in FIG. 10 in a state in which the GGMOS 22 is not connected. At assembly time of the circuit, a potential is not applied to the gate electrodes of the two MOS transistors M1 and M2, and thus each of the gate electrode is in a state of potentially floating (floating state). Accordingly, if an ESD surge enters at assembly time, the gates of the MOS transistors M1 and M2 turn on, and thus a current I caused by the ESD surge flows through a circuit in the subsequent stage from the electric fuse 21, and the electric fuse 21 might be broken as a result.

Next, a description will be given of the case where a current I caused by an ESD surge flows at assembly time of the circuit in the circuit configuration in FIG. 11 in a state in which the GGMOS 22 is connected. In this case, at assembly time of the circuit, a potential is also not applied to the gate electrodes of the two MOS transistors M1 and M2, and thus each of the gate electrode is in a state of potentially floating. Here, it is assumed that an ESD surge of 4 V is input. Then, the GGMOS 22 is configured to operate at an input voltage of 3.5 V, and thus the ESD surge enters into the GGMOS 22 side, and the GGMOS 22 diverts the current I caused by the ESD surge to ground.

Accordingly, the ESD surge is not input into the subsequent circuit to the electric fuse 21, and the electric fuse 21 will not be broken. In this manner, by connecting the GGMOS 22, it is possible to prevent the electric fuse 21 from being broken by the ESD surge that occurs at assembly time of the circuit.

On the other hand, a description will be given of the case where a voltage of 4 V is applied to break the electric fuse 21 when electric current is on in the circuit configuration in FIG. 12, in which the GGMOS 22 is connected. When electric current is on, in order for the current to flow to the subsequent circuit to the electric fuse 21, the gate electrodes of the MOS transistors M1 and M2 are turned on. In this state, it is assumed that an input voltage of 4 V is applied in order to break the electric fuse 21. Then, since the GGMOS 22 is configured to operate at the input voltage of 3.5 V, even if the electric fuse 21 is tried to be broken, the current does not flow into the MOS transistors M1 and M2, and this causes a problem in that the electric fuse 21 fails to be broken.

Accordingly, in the case of protecting a circuit to be protected including the electric fuse 21 using the GGMOS 22, even if it is possible to protect the subsequent circuit to the electric fuse 21 at assembly time of the circuit, it becomes difficult for the electric fuse 21 to be broken when electric current is on.

From the above problem, for a protection element that protects the circuit to be protected including an electric fuse, it is necessary to have a function of protecting a circuit against a surge current at assembly time, and allowing an input signal to directly pass when electric current is on. Further, it is further desirable for the protection element to have a function of protecting a circuit in the subsequent stage to the electric fuse in the case where an ESD surge higher than a breaking voltage of the electric fuse enters when electric current is on.

As described above, it is difficult for a related-art GGMOS to solve such a problem. Also, a rise time of a pulse that breaks an electric fuse is as short as that of an ESD surge. Accordingly, even if an RCMOS is used in order to protect a circuit to be protected including an electric fuse, it is difficult for the RCMOS to distinguish an ESD surge pulse from a pule that breaks the electric fuse.

As a result of a serious study, proposers of the present disclosure technique have developed a protection element capable of protecting a circuit to be protected against an ESD surge at assembly time of the circuit and when electric current is on, and further capable of allowing the circuit to be protected to suitably function by a normal input when electric current is on.

In the following, a description will be given of an example of a protection element and a signal processing method thereof, and a semiconductor device, according to an embodiment of the present disclosure with reference to the drawings. The embodiment of the present disclosure will be described in the following order. In this regard, the technique of the present disclosure is not limited to the following example.

1. An embodiment of the present disclosure: semiconductor device including protection element
  1.1 Circuit configuration
  1.2 Signal processing method
2. Embodiment: semiconductor device including protection element and circuit to be protected including electric fuse

Figure 1:
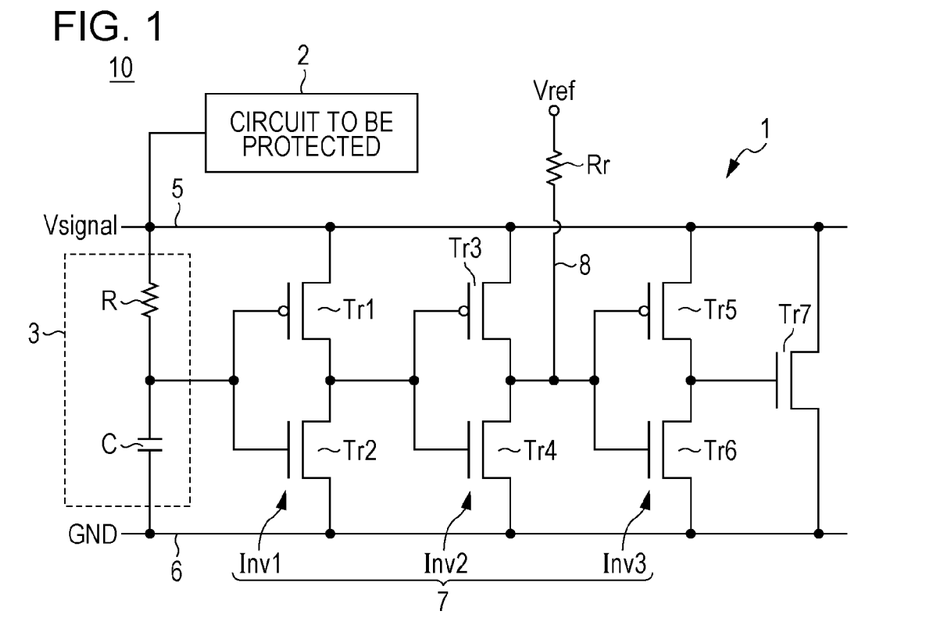
FIG. 1 is a circuit configuration diagram of a semiconductor device including a protection element according to an embodiment of the present disclosure.

1. An Embodiment According to the Present Disclosure: Semiconductor Device Including Protection Element 1.1 Circuit Configuration FIG. 1 is a circuit configuration diagram of a semiconductor device including a protection element according to an embodiment of the present disclosure. As illustrated in FIG. 1, a semiconductor device 10 according to the present embodiment includes a circuit to be protected 2 and a protection element 1 for protecting the circuit to be protected 2. Here, the circuit to be protected 2 is illustrated by a block diagram.

The protection element 1 includes a first wiring line 5, a second wiring line 6, a resistive element R, a capacitive element C, an inverter circuit 7 including a first inverter Inv1, a second inverter Inv2, and a inverter Inv3, a leader line 8, and a protection transistor Tr7.

The first wiring line 5 is a wiring line that supplies a predetermined signal voltage from a signal-voltage supply section not illustrated in FIG. 1 to the circuit to be protected 2. Accordingly, the first wiring line 5 is connected to each element included in the protection element 1, and is connected to the circuit to be protected 2. The second wiring line 6 is a wiring line, on which a criterion voltage is supplied, and in the present embodiment, a ground potential GND is supplied, for example.

The resistive element R and the capacitive element C are connected in series between the first wiring line 5 and the second wiring line 6. Accordingly, one terminal of the resistive element R is connected to the first wiring line 5, and the other terminal is connected to one electrode of the capacitive element C. And the other electrode of the capacitive element C is connected to the second wiring line 6. Thereby, a detection circuit 3 including the resistive element R and the capacitive element C that are connected in series is disposed between the first wiring line 5 and the second wiring line 6.

The first inverter Inv1 includes a p-channel type MOS transistor (hereinafter referred to as a PMOS transistor) Tr1, and an n-channel type MOS transistor (hereinafter referred to as an NMOS transistor) Tr2 that are connected in series between the first wiring line 5 and the second wiring line 6. The gates of the PMOS transistor Tr1 and the NMOS transistor Tr2 (the input terminal of the first inverter Inv1) forming the first inverter Inv1 are electrically connected to a connection point of the resistive element R and the capacitive element C. The source of the PMOS transistor Tr1 is connected to the first wiring line 5, and the drain thereof is connected to the drain of the NMOS transistor Tr2. Also, the source of the NMOS transistor Tr2 is connected to the second wiring line 6.

In the first inverter Inv1, the connection point of the PMOS transistor Tr1 and the NMOS transistor Tr2 becomes an output terminal of the first inverter Inv1.

The second inverter Inv2 includes a PMOS transistor Tr3 and an NMOS transistor Tr4 that are connected in series between the first wiring line 5 and the second wiring line 6. The gates of the PMOS transistor Tr3 and the NMOS transistor Tr4 (the input terminal of the second inverter Inv2) forming the second inverter Inv2 are electrically connected to the output terminal of the first inverter Inv1. The source of the PMOS transistor Tr3 is connected to the first wiring line 5, and the drain thereof is connected to the drain of the NMOS transistor Tr4. Also, the source of the NMOS transistor Tr4 is connected to the second wiring line 6. In the second inverter Inv2, the connection point of the PMOS transistor Tr3 and the NMOS transistor Tr4 becomes an output terminal of the second inverter Inv2.

The third inverter Inv3 includes a PMOS transistor Tr5 and an NMOS transistor Tr6 that are connected in series between the first wiring line 5 and the second wiring line 6. The gates of the PMOS transistor Tr5 and the NMOS transistor Tr6 (the input terminal of the third inverter Inv3) forming the third inverter Inv3 are electrically connected to the output terminal of the second inverter Inv2. The source of the PMOS transistor Tr5 is connected to the first wiring line 5, and the drain thereof is connected to the drain of the NMOS transistor Tr6. Also, the source of the NMOS transistor Tr6 is connected to the second wiring line 6. In the second inverter Inv3, the connection point of the PMOS transistor Tr5 and the NMOS transistor Tr6 becomes an output terminal of the third inverter Inv3.

The leader line 8 is connected to a connection point between the second inverter Inv2 and the third inverter Inv3, and supplies a reference voltage Vref to the connection point through the resistive element Rr when electric current is on.

The protection transistor Tr7 is formed by an NMOS transistor connected between the first wiring line 5 and the second wiring line 6. The gate of the protection transistor Tr7 is electrically connected to the connection point (output terminal) between the PMOS transistor Tr5 and the NMOS transistor Tr6 that are included in the third inverter Inv3. Also, the drain of the protection transistor Tr7 is connected to the first wiring line 5, and the source thereof is connected to the second wiring line 6.

With the above configuration, the detected signal by the detection circuit 3 including the resistive element R and the capacitive element C is input into the input terminal of the first inverter Inv1. Also, a signal output from the first inverter Inv1 is input into the input terminal of the second inverter Inv2. Also, a signal output from the second inverter Inv2 or the reference voltage Vref through the leader line 8 is input into the input terminal of the third inverter Inv3. And a signal output from the third inverter Inv3 is input into the gate of the protection transistor Tr7.

1.2 Signal Processing Method

A description will be given of a signal processing method (operation of the protection element 1) in a semiconductor device 10 according to the present embodiment by dividing into the following three cases: 1.2.1 in the case where ESD surge enters at assembly time; 1.2.2 in the case where normal signal pulse enters when electric current is on; and 1.2.3 in the case where ESD surge enters when electric current is on. Here, operation of the protection element 1 is examined using Human Body Model (HBM) as an ESD surge model.

1.2.1 In the Case where ESD Surge Enters at Assembly Time

Figure 2:
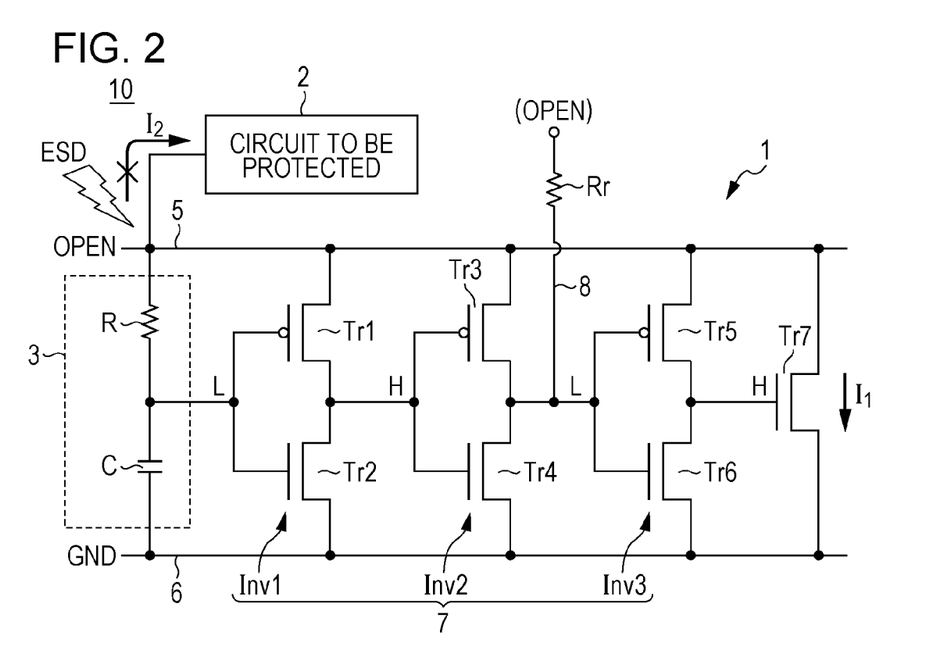
FIG. 2 is a circuit diagram of the semiconductor device at assembly time.

FIG. 2 is a circuit diagram of the semiconductor device 10 at assembly time (in the process of assembly). For example, as illustrated in FIG. 2, at assembly time of an electronic system, and so on, in general, ground potential GND is often supplied only on the second wiring line 6, which is a criterion voltage wiring line, for electrostatic countermeasure. On the other hand, the first wiring line 5 is not connected to the signal-voltage supply section (omitted to be illustrated in FIG. 2), and electric current is off. Accordingly, the potential of the first wiring line 5 is in an indefinite state (floating state).

Also, the reference voltage Vref is not supplied to the input terminal of the third inverter Inv3. Accordingly, the gate potential of the third inverter Inv3 is also an indefinite state (floating state).

Figure 3:
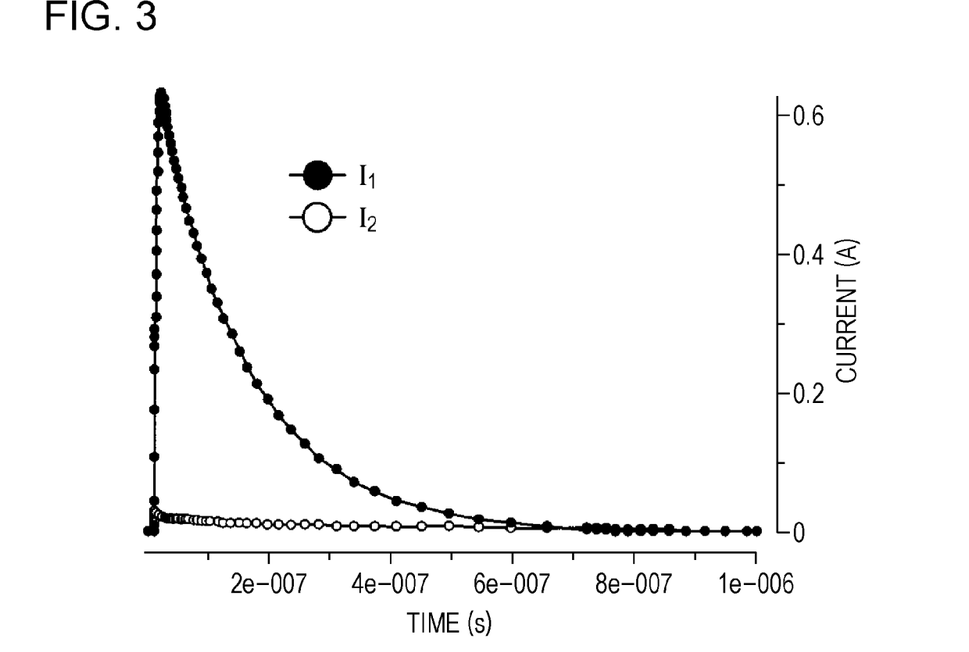
FIG. 3 is a simulation result of a current $I_1$ flowing through a protection transistor, and a current $I_2$ flowing through a circuit to be protected when an ESD surge enters onto a first wiring line at assembly time.

FIG. 3 is a simulation result of a current $I_1$ flowing through the protection transistor Tr7, and a current $I_2$ flowing through the circuit to be protected 2 when an ESD surge enters onto the first wiring line 5 at assembly time. The vertical axis in FIG. 3 represents current, and the horizontal axis represents time.

As described above, at assembly time, the terminal of the leader line 8 is in a floating state, that is to say, an open state, and thus the protection element 1 becomes a general RCMOS. In this state, when an ESD surge is input into the first wiring line 5, a discharge current flows through the capacitor capacitive element C by the same effect as that of high-pulse input, and thus the capacitive element C becomes a low impedance state only for a very short time period. Thereby, a delay occurs that is determined by a time constant of the capacitive element C and the resistive element R, and a rising edge of potential at the connection point between the capacitive element C and the resistive element R delays with respect to a rising edge of potential on the first wiring line 5.

Then, input to the first inverter Inv1 becomes a low level (L level) with respect to the wiring line of the first wiring line 5 for a very short time until the potential at the connection point between the capacitive element C and the resistive element R reaches the threshold voltage of the first inverter Inv1. Thereby, in the first inverter Inv1, the PMOS transistor Tr1 becomes the on state, and a high level (H level) signal is input into the second inverter Inv2.

When the H level signal is input into the second inverter Inv2, the NMOS transistor Tr2 becomes the on state, and the L level signal is output from the second inverter Inv2. At this time, the leader line 8 connected to the connection point between the second inverter Inv2 and the third inverter Inv3 is an open state, and thus the L level signal output from the second inverter Inv2 is input into the third inverter Inv3. Thereby, the PMOS transistor Tr5 of the third inverter Inv3 becomes the on state, and the H level signal is input into the gate of the protection transistor Tr7.

Accordingly, the gate potential of the protection transistor Tr7 becomes the H level for only a short time, thus the channel becomes open, and as illustrated in FIG. 2, a current I1 caused by the ESD surge that is input on the first wiring line 5 flows to ground (the second wiring line 6) through the protection transistor Tr7. During this time period, a current I2 caused by the ESD surge does not flow to the circuit to be protected 2.

As described above, at assembly time, a pulse having a rise time shorter than a time constant of the detection circuit 3 formed by the resistive element R and the capacitive element C is regarded as an ESD surge all the time, and the current I1 flowing through the first wiring line 5 is discharged to ground through the protection transistor Tr7. Accordingly, the current does not flow through the circuit to be protected 2, and thus the circuit to be protected 2 is protected against the ESD surge.

1.2.2 In the Case where Normal Signal Pulse Enters when Electric Current is on

Here, "In the case where normal signal pulse enters when electric current is on" means an operation state in which although there are potential variations on the first wiring line 5, which are scheduled at normal operation time, an ESD surge that is as high as turning on the protection transistor Tr7 is not input. Also, here, a description will be given of the case where a signal pulse Vsignal having a same rise time as short as an ESD surge is input into as a signal pulse that is input into the first wiring line 5 when electric current is on in order to cut the electric fuse, for example.

Figure 4:
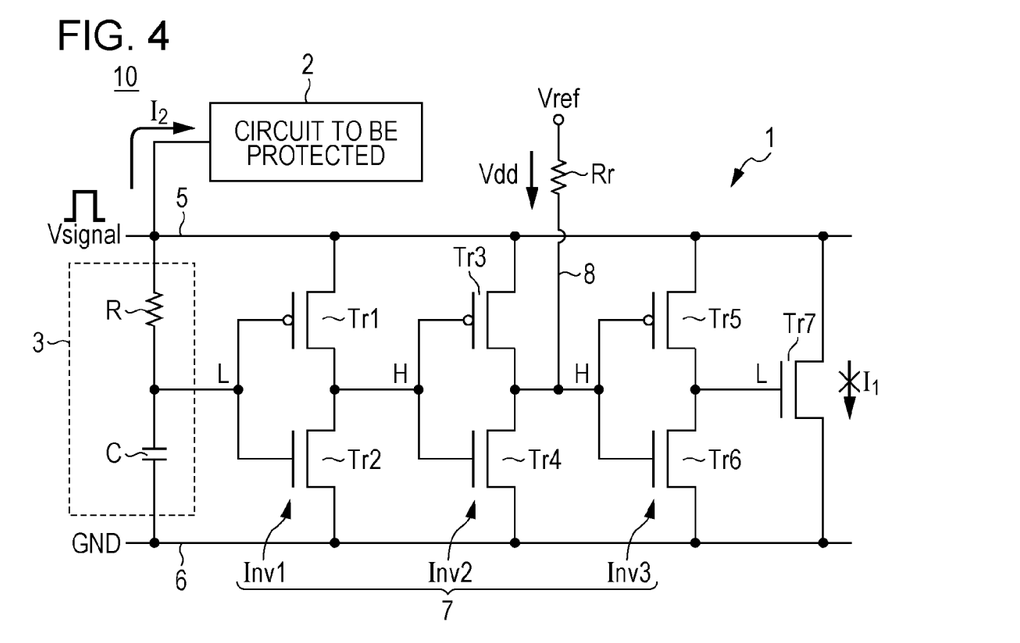

FIG. 4 is a circuit diagram of the semiconductor device 10 when electric current is on. When electric current is on, in the present embodiment, a signal voltage Vsignal (=power source voltage Vdd) is supplied on the first wiring line 5, and a ground potential GND is supplied on the second wiring line 6. On the other hand, the power source voltage Vdd is supplied to the third inverter Inv3 through the leader line 8 as the reference voltage Vref. That is to say, when electric current is on, the same potential as that of the signal voltage Vsignal (=Vdd) supplied on the first wiring line 5 is supplied to the input terminal of the third inverter Inv3. In this regard, here, a simulation is carried out with a power source voltage Vdd=3 V.

Figure 5:
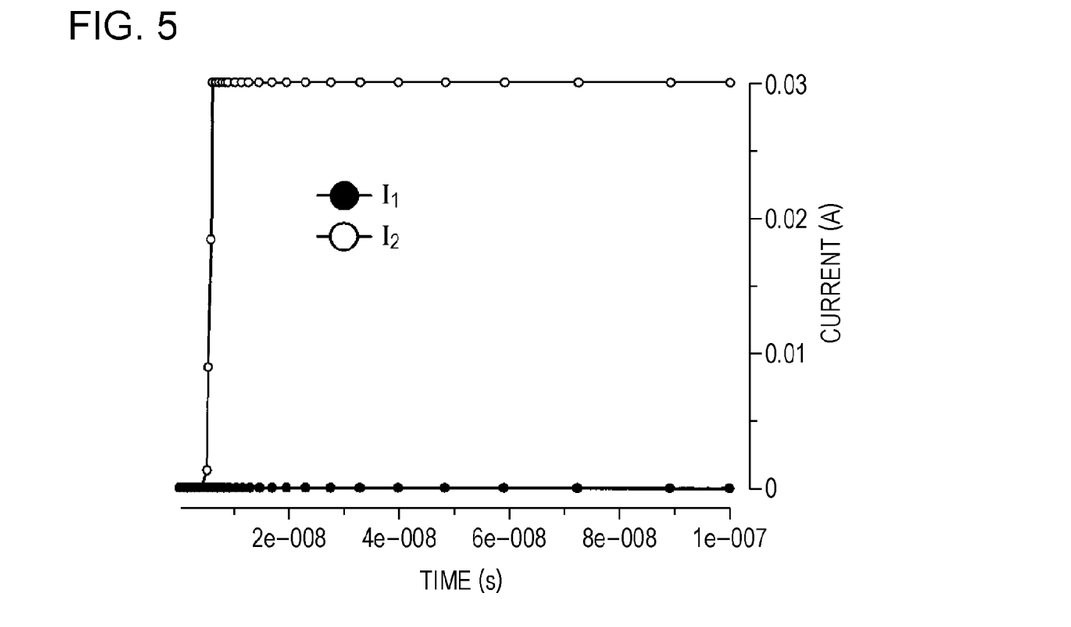

FIG. 5 is a simulation result of a current $I_1$ flowing through the protection transistor Tr7, and a current $I_2$ flowing through the circuit to be protected 2 when electric current is on. The vertical axis in FIG. 5 represents current, and the horizontal axis represents time.

When electric current is on, a signal pulse having a short rise time is input onto the first wiring line 5, for the same reason as the case where an ESD surge is input in the above-described 1.2.1, the L level is input into the first inverter Inv1, and the H level signal is input into the second inverter Inv2. Then, the L level signal is output from the second inverter Inv2, and at this time, the power source voltage Vdd, that is to say, the H level signal is input into the connection point between the second inverter Inv2 and the third inverter Inv3 through the leader line 8. Accordingly, in the third inverter Inv3, the NMOS transistor Tr6 becomes the on state, and the L level signal is input into the gate of the protection transistor Tr7.

Accordingly, the gate potential of the protection transistor Tr7 becomes the L level, and the protection transistor becomes the off state. Thereby, as illustrated in FIG. 5, a normal signal pulse input onto the first wiring line 5 does not flow to ground (the second wiring line 6) through the protection transistor Tr7. And the normal signal pulse is supplied to the circuit to be protected 2 during this period. In this manner, in the present embodiment, at normal operation time when electric current is on, a current does not flow to the protection element 1, and all the current flows into the circuit to be protected 2.

1.2.3 in the Case where ESD Surge Enters when Electric Current is on

Here, "In the case where ESD surge enters when electric current is on" means an operation state in which an ESD surge that is equal to or higher than a signal pulse scheduled at normal operation time is input.

Figure 6:
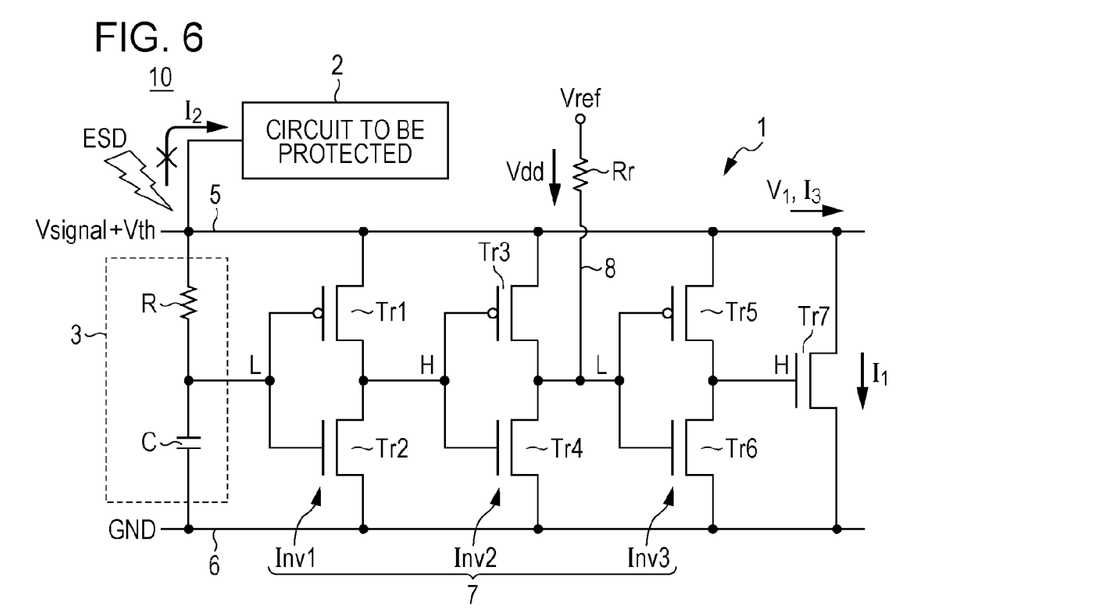

FIG. 6 is a circuit diagram of a semiconductor device 10 in the case where an ESD surge enters when electric current is on. In the present embodiment, a description will be given of the signal processing of the protection element 1 in the case where an ESD surge that is higher than the signal voltage Vsignal (=the power source voltage Vdd)+Vth is input on the first wiring line 5 when electric current is on. Here, Vth is a predetermined threshold voltage, and is determined depending on the configuration of the circuit to be protected 2 and the configuration of the inverter circuit 7 in addition. In this case, the configuration of the protection element 1 is the same as that at normal operation time, the ground potential GND is supplied onto the second wiring line 6, and the power source voltage Vdd is supplied to the input terminal of the third inverter Inv3 through the leader line 8.

Figure 7:
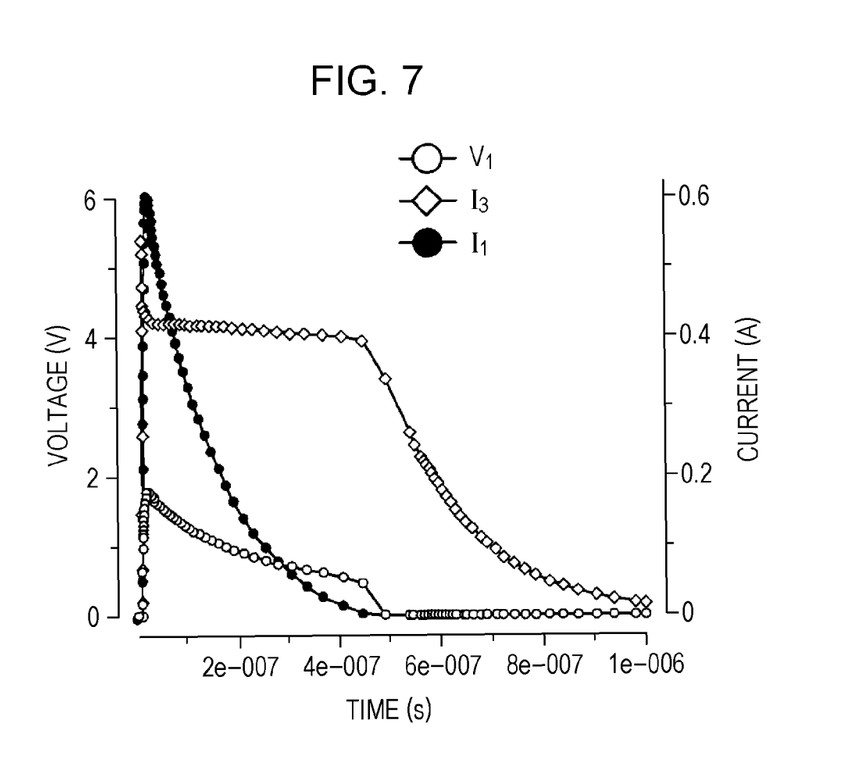
Figure 8:
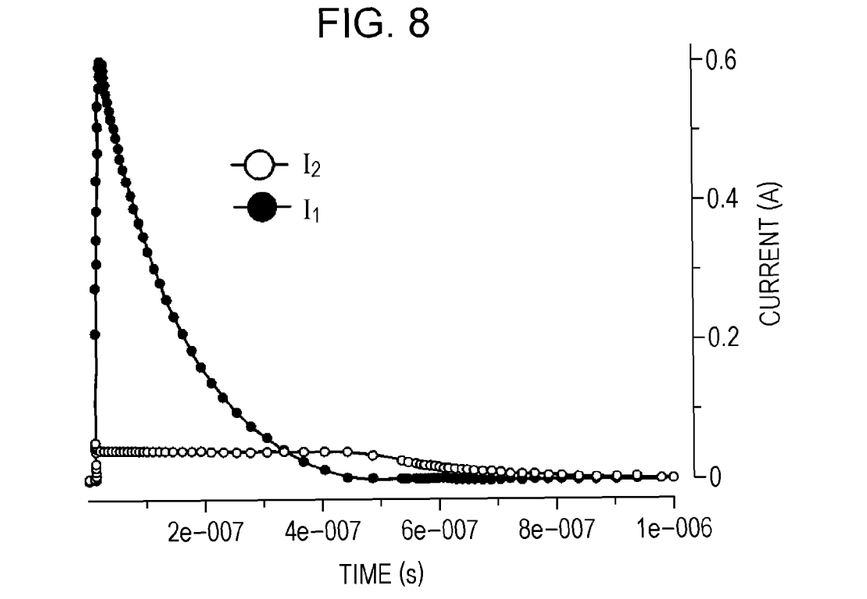

FIG. 7 illustrates a simulation result of a current $I_3$ and a voltage $V_1$ at the drain of the protection transistor Tr7, and a current $I_1$ flowing through the protection transistor Tr7 in the case where an ESD surge enters when electric current is on. Also, FIG. 8 illustrates a simulation result of a current $I_1$ flowing through the protection transistor Tr7, and a current $I_2$ flowing through the circuit to be protected in the case where an ESD surge enters when electric current is on. The vertical axis in FIG. 7 represents current and voltage, and the horizontal axis represents time. Also, the vertical axis in FIG. 8 represents current, and the horizontal axis represents time.

In the case where an ESD surge of voltage Vsignal+Vth is input onto the first wiring line 5 when electric current is on, until the input voltage exceeds the voltage Vsignal, it is difficult to distinguish whether the input voltage is a normal signal pulse or the ESD surge. Accordingly, the protection element 1 operates in the same manner as the operation in 1.2.2 described above, and thus a slight current flows into the circuit to be protected 2. However, when the input voltage exceeds the voltage Vsignal+Vth, the input potential and the output potential of the third inverter Inv3 are inverted from the state in 1.2.2. Thereby, the third inverter Inv3 outputs the H level signal, and the H level signal is input into the protection transistor Tr7, and thus the protection transistor Tr7 becomes the on state. As a result, as illustrated in FIG. 7 and FIG. 8, the ESD surge of the voltage Vsignal+Vth flows to ground (second wiring line 6) through the protection transistor Tr7. Thereby, the ESD surge does not flow to the circuit to be protected 2.

In this manner, in the present embodiment, in the case where an ESD surge is input on the first wiring line 5 when electric current is on, the ESD surge current flows to ground through the protection transistor Tr7, and thus it is possible to protect the circuit to be protected 2 against the ESD surge.

As described above, in the present embodiment, at assembly time, and so on when an ESD surge is input at the time the power is off, and when an ESD surge equal to or higher than the normal signal pulse is input at normal operation time, it is possible to prevent the ESD surge from flowing to the circuit to be protected 2.

Also, in a related-art RCMOS, there has been a problem in that when a pulse-state signal that is as short as an ESD surge is to be flowed to the circuit to be protected, it is difficult for the RCMOS to distinguish the signal pulse from the ESD surge. In contrast, in the present embodiment, if a normal signal pulse is input when electric current is on, it is possible for the signal pulse to flow into the circuit to be protected 2. In this regard, in the present embodiment, a description has been given of the case where a signal pulse having a short rise time is supplied to the circuit to be protected 2 when electric current is on. However, it is possible for the protection element 1 used in the present embodiment to be used in the case of supplying a pulse-state signal having a relatively longer rise time than an ESD surge to the circuit to be protected 2 in the same manner.

Further, in a normal RCMOS-type protection element, it is possible to configure the protection element 1 according to the present embodiment only by connecting a leader line to the output terminal of the third inverter, and to supply a reference voltage. Accordingly, in the present embodiment, it is not necessary to have a complicated circuit, and so on, and a large circuit area. In this manner, in the semiconductor device 10 according to the present embodiment, it is possible for the protection element 1 to reliably protect the circuit to be protected 2 against an ESD surge easily, and thus it is possible to improve a yield, and to achieve simplification of an assembly process.

In this regard, in the present embodiment, an example has been given of the case where the protection element 1 is configured by three inverters. However, as long as an odd number of inverters are provided, it is possible to configure the protection element 1 by any number of inverters. In this case, it is possible to obtain the same advantages as the present embodiment by connecting a wiring line supplying the reference voltage Vref to the input terminal of an inverter in the final stage.

Also, in the present embodiment, an example has been given of the case where the protection element 1 is configured by three inverters. However, it is possible to configure the protection element 1 by an even number of inverters. In this case, it is possible to obtain the same advantages as those of the present embodiment by configuring the protection transistor using a p-channel type MOS transistor, and connecting a wiring line supplying the reference voltage Vref to the gate of an inverter in the final stage.

2. Embodiment

Figure 9:
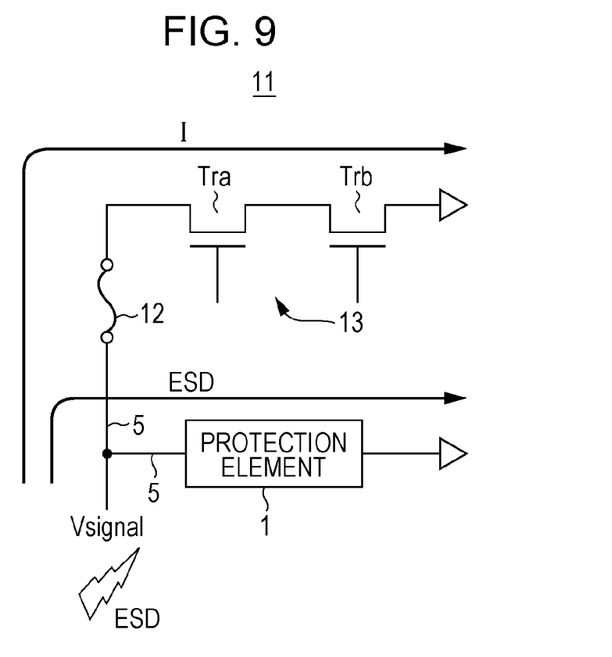
FIG. 9 is a circuit diagram of a semiconductor device according to an embodiment of the present disclosure.

Next, a description will be given of a semiconductor device according to an embodiment of the present disclosure. FIG. 9 is a circuit diagram of a semiconductor device 11 according to an embodiment of the present disclosure. As illustrated in FIG. 9, the semiconductor device 11 according to the present embodiment includes a circuit to be protected 13 including an electric fuse 12, and a protection element 1. In FIG. 9, the configuration of the protection element 1 is the same as that in FIG. 1, and thus the protection element 1 is illustrated by a block diagram, and a detailed description will be omitted.

As illustrated in FIG. 9, in the semiconductor device 11 according to the present embodiment, the circuit to be protected 13 includes an electric fuse 12 and desired MOS transistors (here, two MOS transistors Tra and Trb). And the two MOS transistors Tra and Trb are connected to the first wiring line 5 in series through the electric fuse 12.

A description will be given of operation of the protection element 1 in the semiconductor device 11 according to the present embodiment by dividing into the following three cases: in the case where ESD surge enters at assembly time; in the case where signal pulse for breaking the electric fuse 12 enters when electric current is on; and in the case where ESD surge enters when electric current is on.

In the case where ESD surge enters at assembly time

When an ESD surge enters onto the first wiring line 5 in the process of assembly, the protection element 1 operates in the same manner as operation in the first embodiment in 1.2.1. Accordingly, the ESD surge flows to ground, and is not input to the circuit to be protected 13. Accordingly, the electric fuse 12 is not unnecessarily broken by an ESD surge that occurs at assembly time.

In the case where signal pulse for breaking the electric fuse 12 enters when electric current is on In the case where a signal pulse for breaking the electric fuse 12 enters when electric current is on, the protection element 1 operates in the same manner as the operation in the first embodiment in 1.2.2. Accordingly, the current I does not flow to ground by the signal pulse for breaking the electric fuse 12, and thus the current I flows to the circuit to be protected 13. Thereby, it is possible to break the electric fuse 12.

In the case where ESD surge enters when electric current is on

In the case where an ESD surge enters when electric current is on, the protection element 1 operates in the same manner as the operation in the first embodiment in 1.2.3. Accordingly, the ESD surge flows to ground, and is not input to the circuit to be protected 13. Accordingly, the electric fuse 12 is not unnecessarily broken by the ESD surge that occurs when electric current is on.

In this manner, by the present embodiment, in the case of mounting the circuit to be protected 13 that is driven by a signal pulse having a short rise time as that of an ESD surge, it is possible to suitably protect the circuit to be protected 13 using the protection element 1 in which a reference voltage is supplied to the gate of the inverter in the final stage.

In the present embodiment, a description has been given of a circuit including the electric fuse 12 that breaks a current path by giving a signal pulse as the circuit to be protected 13. However, a circuit to be protected 13 that can be applied to the present embodiment is not limited to this. For example, it is possible to apply a circuit including an anti-fuse that connects a current path by giving a signal pulse as a circuit to be protected 13. In this case, it is also possible to suitably protect a circuit to be protected against an ESD surge by replacing the circuit to be protected 13 illustrated in FIG. 9 by a circuit including an anti-fuse.

Also, it is possible for the semiconductor device described above to be applied to various electronic systems, for example, an imaging device, a computer, an image display apparatus, and so on. And it is possible to improve reliability using a semiconductor device in which a protection element according to the present disclosure is incorporated.

In this regard, it is possible to configure the present disclosure as follows.

(1) A protection element including a first wiring line configured to be supplied with a signal voltage when electric current is on; a second wiring line configured to be supplied with a criterion voltage; a detection circuit connected between the first wiring line and the second wiring line, and configured to detect the signal voltage inputted onto the first wiring line; an inverter circuit including a plurality of inverters connected between the first wiring line and the second wiring line, and configured to be supplied with a reference voltage having a same level as that of the signal voltage between an odd-numbered inverter and an even-numbered inverter when electric current is on; and a protection transistor connected between the first wiring line and the second wiring line, and having a gate configured to receive output of the inverter circuit.

(2) The protection element according to (1), wherein the reference voltage is supplied to an input terminal of an inverter in a final stage, and output of an inverter in a stage preceding to the inverter in the final stage is input into the input terminal of the inverter in the final stage when electric current is off.

(3) The protection element according to (2), wherein if a voltage greater than the reference voltage is input onto the first wiring line when electric current is on, the output the an inverter in a stage preceding to the inverter in the final stage is input into the input terminal of the final stage.

(4) The protection element according to any one of (1) to (3), wherein the inverter circuit includes an odd number of the inverters, and a channel conductive type of the protection transistor is an n type.

(5) The protection element according to any one of (1) to (3), wherein the inverter circuit includes an even number of the inverters, and a channel conductive type of the protection transistor is a p type.

(6) The protection element according to any one of (1) to (5), wherein the detection circuit includes a resistive element and a capacitive element connected in series, the resistive element is disposed by being connected to the first wiring line, and the capacitive element is disposed by being connected to the second wiring line, and a connection point between the resistive element and the capacitive element is connected to an input terminal of an inverter in a first stage of the inverter circuit.

(7) A semiconductor device including a protection element including a first wiring line configured to be supplied with a signal voltage when electric current is on, a second wiring line configured to be supplied with a criterion voltage, a detection circuit connected between the first wiring line and the second wiring line, and configured to detect the signal voltage inputted onto the first wiring line, an inverter circuit including a plurality of inverters connected between the first wiring line and the second wiring line, and configured to be supplied with a reference voltage having a same level as that of the signal voltage between an odd-numbered inverter and an even-numbered inverter when electric current is on, and a protection transistor connected between the first wiring line and the second wiring line, and having a gate configured to receive output of the inverter circuit; and a circuit to be protected being connected to the first wiring line.

(8) The semiconductor device according to (7), wherein the circuit to be protected includes an electric fuse to be broken by a predetermined signal pulse.

(9) The semiconductor device according to (7), wherein the circuit to be protected includes an anti-fuse to be connected by a predetermined signal pulse.

(10) An electronic system including a semiconductor device, the semiconductor device including a protection element including a first wiring line configured to be supplied with a signal voltage when electric current is on, a second wiring line configured to be supplied with a criterion voltage, a detection circuit connected between the first wiring line and the second wiring line, and configured to detect the signal voltage inputted onto the first wiring line, an inverter circuit including a plurality of inverters connected between the first wiring line and the second wiring line, and configured to be supplied with a reference voltage having a same level as that of the signal voltage between an odd-numbered inverter and an even-numbered inverter when electric current is on, and a protection transistor connected between the first wiring line and the second wiring line, and having a gate configured to receive output of the inverter circuit; and a circuit to be protected being connected to the first wiring line.

The present disclosure contains subject matter related to that disclosed in Japanese Priority Patent Application JP 2012-159788 filed in the Japan Patent Office on Jul. 18, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A protection element comprising:
   a first wiring line configured to be supplied with a signal voltage when electric current is on;
   a second wiring line configured to be supplied with a criterion voltage;
   a detection circuit connected between the first wiring line and the second wiring line, and configured to detect the signal voltage inputted onto the first wiring line;
   an inverter circuit including a plurality of inverters connected between the first wiring line and the second wiring line, and configured to be supplied with a reference voltage having a same level as that of the signal voltage between an odd-numbered inverter and an even-numbered inverter when electric current is on; and
   a protection transistor connected between the first wiring line and the second wiring line, and having a gate configured to receive output of the inverter circuit,
   wherein the reference voltage is supplied in an event a signal pulse capable of turning on the protection transistor is absent on the first wiring line.

2. The protection element according to claim 1, wherein the reference voltage is supplied to an input terminal of an inverter in a final stage, and output of an inverter in a stage preceding to the inverter in the final stage is input into the input terminal of the inverter in the final stage when the first wiring line is not supplied with the signal voltage and electric current is off.

3. The protection element according to claim 2, wherein if a voltage greater than the reference voltage is input onto the first wiring line when electric current is on, the output of the inverter in a stage preceding to the inverter in the final stage is input into the input terminal of the inverter in the final stage.

4. The protection element according to claim 1, wherein the inverter circuit includes an odd number of the plurality of inverters, and a channel conductive type of the protection transistor is an n type.

5. The protection element according to claim 1, wherein the inverter circuit includes an even number of the plurality of inverters, and a channel conductive type of the protection transistor is a p type.

6. The protection element according to claim 3, wherein the detection circuit includes a resistive element and a capacitive element connected in series, the resistive element is disposed by being connected to the first wiring line, and the capacitive element is disposed by being connected to the second wiring line, and a connection point between the resistive element and the capacitive element is connected to an input terminal of an inverter in a first stage of the inverter circuit.

7. A semiconductor device comprising:
   a protection element including:
      a first wiring line configured to be supplied with a signal voltage when electric current is on;
      a second wiring line configured to be supplied with a criterion voltage;
      a detection circuit connected between the first wiring line and the second wiring line, and configured to detect the signal voltage inputted onto the first wiring line;
      an inverter circuit including a plurality of inverters connected between the first wiring line and the second wiring line, and configured to be supplied with a reference voltage having a same level as that of the signal voltage between an odd-numbered inverter and an even-numbered inverter when electric current is on; and
      a protection transistor connected between the first wiring line and the second wiring line, and having a gate configured to receive output of the inverter circuit,
      wherein the reference voltage is supplied in an event a signal pulse capable of turning on the protection transistor is absent on the first wiring line; and
   a circuit to be protected being connected to the first wiring line.

8. The semiconductor device according to claim 7, wherein the circuit to be protected includes an electric fuse to be broken by a predetermined signal pulse.

9. The semiconductor device according to claim 7, wherein the circuit to be protected includes an anti-fuse to be connected by a predetermined signal pulse.

10. An electronic system including a semiconductor device, the semiconductor device comprising:
    a protection element including:
       a first wiring line configured to be supplied with a signal voltage when electric current is on;
       a second wiring line configured to be supplied with a criterion voltage;
       a detection circuit connected between the first wiring line and the second wiring line, and configured to detect the signal voltage inputted onto the first wiring line;
       an inverter circuit including a plurality of inverters connected between the first wiring line and the second wiring line, and configured to be supplied with a reference voltage having a same level as that of the signal voltage between an odd-numbered inverter and an even-numbered inverter when electric current is on; and
       a protection transistor connected between the first wiring line and the second wiring line, and having a gate configured to receive output of the inverter circuit,
       wherein the reference voltage is supplied in an event a signal pulse capable of turning on the protection transistor is absent on the first wiring line; and
    a circuit to be protected being connected to the first wiring line.

* * * * *